July 1, 1958 F. MINECK 2,841,412
AUTOMOTIVE IDLER ARM STABILIZER
Filed May 25, 1956
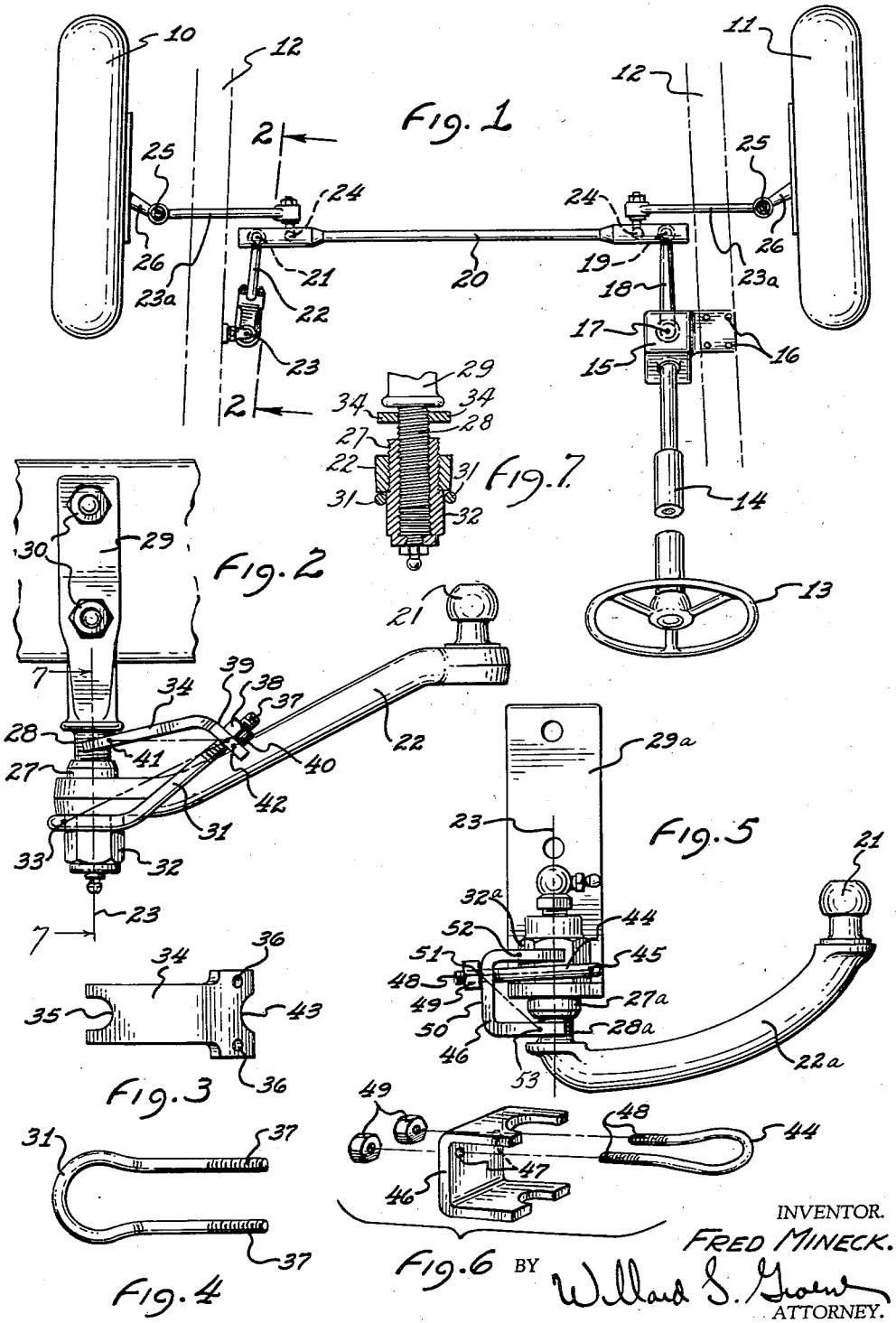
INVENTOR.
FRED MINECK.
BY Willard S. Groen
ATTORNEY.

2,841,412
AUTOMOTIVE IDLER ARM STABILIZER

Fred Mineck, Phoenix, Ariz.

Application May 25, 1956, Serial No. 587,349

2 Claims. (Cl. 280—95)

This invention pertains to improvements in automotive idler arm stabilizers and is particularly directed to an improved attachment to take out the back-lash and rattle in the idler arm mounting.

One of the objects of this invention is to provide an improved automotive idler arm stabilizer which is easily adapted to be applied in the field to existing automotive structures.

Still another object of this invention is to provide a tensioning device for locking out back-lash, rattle and chatter in the pivotal mounting of the idler arm on the frame bracket of the steering mechanism of the motor vehicle.

Still another object of this invention is to provide a three point pressure applying attachment to the pivotal mounting joint between the bracket and idler arm of the automotive steering linkage system to eliminate chatter, vibration and rattle at this point.

Further features and advantages of this invention will appear from a detailed description of the drawings in which:

Fig. 1 is a general view of the steering linkage incorporating the idler arm stabilizer having the features of this invention.

Fig. 2 is an enlarged side view on the line 2—2 of one form of stabilizer arm incorporating the features of this invention.

Fig. 3 is a plan view of part of the stabilizer attachment of Fig. 2.

Fig. 4 is a plan view of another part of the stabilizer mechanism shown in Fig. 2.

Fig. 5 shows another adaptation of the stabilizer to a different type of stabilizer arm support.

Fig. 6 is an exploded perspective view of the details of the stabilizer mechanism shown in Fig. 5.

Fig. 7 is an enlarged fragmentary section on the line 7—7 of Fig. 2.

As an example of one embodiment of this invention there is shown an automotive vehicle having the front wheels 10 and 11 carried in the usual manner on the frame 12. The steering wheel 13 is carried on the usual column 14 connected to the steering gear box 15 which in turn is fastened by suitable bolts 16 to the frame of the motor vehicle. To the rock shaft 17 of the steering gear 15 is fixed the usual steering gear arm 18 on the outer end of which is provided the usual ball 19 carrying one end of the steering connecting rod 20. The other end of the steering connecting rod 20 is connected to the ball 21 formed on the outer end of the idler arm 22, the idler arm in turn being pivotally mounted about an axis 23 similar to the axis 17 of the rockshaft of the steering gear 15 so that the steering connecting rod 20 moves in parallel transverse motion during the steering of the vehicle. Appropriate drag links 23a are connected by ball joints 24 to the steering connecting rod 20 and in turn are connected by suitable pivotal connections at 25 to the steering spindles 26 of the front wheels 10 and 11 in conventional manner.

Referring to Fig. 2, the idler arm 22 has a bearing bushing 27 rigidly secured in the inner end of the idler arm 22 and has a threaded bore fitting pivotally over the threaded end portion 28 of the idler arm support bracket 29 rigidly fixed to the frame 12 by suitable bolts 30. In practice it is found that wear occurs between the threads in the bushing 27 and the threaded portion 28 of the bracket 29 due to road shock, dust and wear, resulting in vibration and rattling and the transfer of this noise to the frame structure in an annoyable manner to the operator of the motor vehicle. In order to overcome this tendency towards looseness developing at the pivotal mounting of the idler arm 22 on the bracket 29 there has been provided an attachment in the form of a U-bolt 31, Fig. 4, which fits around the rigid nut portion 32 of the bushing 27 providing a rigid surface on the inner end of the idler arm 22 so as to effect a tension pressure at the point 33 thereon. A clamp piece 34 has an arcuate cut-away portion at 35 which fits around the upper portion of the threaded end 28 of the bracket 29 and has two holes 36 through which project the outer threaded ends 37 of the U-bolt 31 and nuts 38 on the outer ends 37 are then tightened down against the abutment surface 39 of the clamp piece 34. When the nuts are tightened down pressure is applied on the outer end of the clamp piece 34 at the point 40 which transfers force through the clamp piece 34 to the point 41 on the threaded portion 28 of the bracket 29. Furthermore, a fourth stop point pressure position 42 of engagement of the arcuate portion 43 of the clamp piece 34 against the intermediate portion of the idler arm 22 sets up a triangle of forces 33—40—41 locking the bushing 27 in firm engagement with the threaded portion 28 of the bracket 29 while still permitting freedom of pivotal motion around the axis 23 for the idler arm 22.

Referring to Fig. 5, in that modification the bushing 27a is carried in the bracket 29a while the threaded end portion 28a is formed on the idler arm 22a. In this situation the U-bolt 44 again engages around the nut portion 32a of the bushing 27a with tension pressure being applied at the point 45 while a U-shaped clamp 46 has holes 47 through which project the outer threaded ends 48 and nuts 49 are then tightened down against the abutment surface 50 of the clamp 46 thus applying pressure at the point 51 to the clamp 46. This applies pressure at the point 52 on the nut portion 32a of the bushing 27a rigidly fixed to the bracket 29a and also at the point 53 on the threaded stem 28a of the idler arm 22a. Thus again a triangle of forces is provided at 45—51—53 to securely lock the bushing 27a, forming a rigid surface on bracket 29a, in firm engagement with the threaded end 28a, forming a rigid surface on the inner end of the idler arm, by permitting pivotal motion of the idler arm 22a on the bracket 29a. By these arrangements as described all wear and back-lash is automatically taken up by the transverse thrust applied in the threaded bearings between the members 27a and 28a so that no longer will objectionable rattle, vibration and inaccuracy in steering result and long life and care-free service are thus assured.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. An idler arm stabilizer for the steering apparatus of an automotive vehicle having a frame, and idler arm bracket fixed on said frame, and an idler arm pivotally mounted at its inner end on said bracket, said stabilizer including a U-bolt engaging around a rigid surface on and below said inner end of said idler arm to one side of the axis of pivotal mounting of said arm on said bracket, a clamp piece engaging said bracket at a diametrically opposite point from the point of engagement of said U-bolt on said idler arm end, clamp nut means on the outer ends of said U-bolt engaging an abutment surface on the outer end of said clamp piece, and a further abutment surface on the outer end of said clamp piece engaging an intermediate portion of said idler arm when said clamp nut means is tightened.

2. An idler arm stabilizer for the steering apparatus of an automotive vehicle having a frame, an idler arm bracket fixed on said frame, and an idler arm pivotally mounted at its inner end on said bracket, said stabilizer including a U-bolt engaging a rigid surface on said bracket at one side of the axis of pivotal mounting of said idler arm on said bracket, a U-clamp having one end engaging a rigid surface on the inner end of said idler arm at a point diametrically opposite the point of engagement of said U-bolt with said rigid surface on said bracket and engaging said bracket at a point diametrically opposite said point of engagement of said U-bolt with said bracket, and clamp nut means on the outer ends of said U-bolt engaging an abutment surface on said U-clamp at a point intermediate the points of engagement of said U-clamp on said idler arm and said bracket.

References Cited in the file of this patent

UNITED STATES PATENTS

| | | |
|---|---|---|
| 1,378,783 | Griffeth | May 17, 1921 |
| 1,482,286 | Colley | Jan. 29, 1924 |
| 2,588,544 | Langer | Mar. 11, 1952 |
| 2,684,260 | Hawley | July 20, 1954 |
| 2,689,756 | Carlson | Sept. 21, 1954 |